(12) United States Patent
Debuf et al.

(10) Patent No.: US 10,756,654 B2
(45) Date of Patent: Aug. 25, 2020

(54) CONTROLLED STOPPING METHOD FOR A TEXTILE MACHINE AND TEXTILE MACHINE STOPPED BY THIS PROCESS

(71) Applicant: NV MICHEL VAN DE WIELE, Kortrijk/Marke (BE)

(72) Inventors: Geert Debuf, Drongen (BE); Wim Lassuyt, Beselare (BE)

(73) Assignee: NV MICHEL VAN DE WIELE (BE)

( * ) Notice: Subject to any disclaimer, the term of this patent is extended or adjusted under 35 U.S.C. 154(b) by 1 day.

(21) Appl. No.: 15/775,382

(22) PCT Filed: Nov. 10, 2016

(86) PCT No.: PCT/IB2016/001603
§ 371 (c)(1),
(2) Date: May 10, 2018

(87) PCT Pub. No.: WO2017/081528
PCT Pub. Date: May 18, 2017

(65) Prior Publication Data
US 2018/0342964 A1   Nov. 29, 2018

(30) Foreign Application Priority Data

Nov. 10, 2015 (BE) .................................. 2015/5738

(51) Int. Cl.
*H02P 29/032* (2016.01)
*H02P 5/68* (2006.01)
(Continued)

(52) U.S. Cl.
CPC .................. *H02P 5/74* (2013.01); *H02P 5/68* (2013.01); *H02P 29/025* (2013.01); *H02P 29/026* (2013.01); *H02P 29/032* (2016.02)

(58) Field of Classification Search
USPC ........................................................... 318/44
See application file for complete search history.

(56) References Cited

U.S. PATENT DOCUMENTS 5,196,769 A * 3/1993 Chiba ...................... D01H 1/32
318/39

FOREIGN PATENT DOCUMENTS

JP    2008079974 A  *  4/2008
JP    2008079974 A     4/2008

OTHER PUBLICATIONS

Written Opinion and International Search Report dated Apr. 5, 2017.
(Continued)

*Primary Examiner* — Jorge L Carrasquillo
(74) *Attorney, Agent, or Firm* — Fresh IP PLC; Aubrey Y Chen (57) ABSTRACT

A method and a device for bringing a textile machine to a controlled standstill in the event of a failure of the power supply, and a correspondingly equipped textile machine, the textile machine having at least two axes that are driven in synchronization by respective electric motors ($M_1$-$M_5$) connected to a common intermediate voltage circuit (1), and in which at least one electric motor acting as power generator can supply electric power to at least one other electric motor via the common DC bus (1), and in which the voltage (V) on the common DC bus is controlled by varying at least two variables in such a way that the voltage follows a previously defined curve while the textile machine is being brought to a standstill.

17 Claims, 5 Drawing Sheets

(51) Int. Cl.
*H02P 29/024* (2016.01)
*H02P 5/74* (2006.01)

(56) References Cited

OTHER PUBLICATIONS

Vance Vandoren, https://www.controleng.com/articles/fundamentals-of-cascade-control/, Title: Fundamentals of cascade control, Publication: Aug. 17, 2014, p. 3.
https://controlguru.com/an-implementation-recipe-for-cascade-control/, Title: An Implementation Recipe for Cascade Control, Publication: Apr. 9, 2015, p. 8.
Merriam Webster Online dictionary: https//www.merriam-webster.com/dictionary/variable.

* cited by examiner

Fig. 5 ic device having the charac-
CONTROLLED STOPPING METHOD FOR A TEXTILE MACHINE AND TEXTILE MACHINE STOPPED BY THIS PROCESS The present application claims priority from Belgian Patent Application No. BE-2015/5738 filed on Nov. 10, 2015, which is incorporated herein by reference.

FIELD OF THE DISCLOSURE

This disclosure relates to a method and a control device for bringing a textile machine to a controlled standstill in a condition without power supply, the textile machine having at least two axes provided to be driven in synchronization by respective electric motors connected to a common intermediate voltage circuit, and in which at least one electric motor acting as power generator can supply electric power to at least one other electric motor via the intermediate voltage circuit.

This disclosure also relates to a textile machine with the properties indicated in the previous paragraph which is equipped with a control device for bringing it to a controlled standstill.

BACKGROUND

The term 'axis' is used here in the sense of the motor axis and the moving motor parts as well as all the parts that are driven by it, such as the gearbox, etc. The term 'textile machine' is used in the sense of any facility for the production, processing, treatment, handling or transporting of textile material and products made from textile material, such as a weaving machine, a tufting machine, a knitting machine, a bobbin winder, a winding machine, etc.

A textile machine generally comprises several independently operating motors that are controlled to set respective interacting parts of the textile machine in synchronized motion. These controls can be position-synchronous, angle-synchronous or speed-synchronous or any combination of these, whereby the synchronization of the axes can have both a fixed ratio ('electronic gearing') and a continuously varying ratio ('electronic camming').

A condition without power supply can, for example, be the result of an unexpected failure of or a reduction in the mains voltage due to an interruption or a fault in the power supply or due to a fault in the textile machine itself or due to an automatic shutdown for safety reasons, but can for example also be the result of a deliberate switching-off of the machine or the power supply.

When the power supply to such a machine fails, it is important in all cases that the various parts of the machine remain in synchronous motion until they have come to a standstill. This avoids collisions between different parts of the machine (e.g. between the reed and the cutting knife of a face-to-face weaving machine) or between a machine part and the textile material, such as yarns (e.g. between a rapier and the warp threads on a weaving machine), so preventing damage to the machine and/or the textile material. Furthermore, the different parts of the machine come to a standstill in such relative positions that the textile machine is immediately ready to start again without any additional recovery procedures.

The international patent publication WO 97/02650 describes a method in which in the event of a failure of the power supply, an energy-dominant axis (this is the axis with the highest kinetic energy) is selected and that this axis is gradually slowed down while the released energy is used to supply the logic units of the different drives via a common intermediate circuit (hereinafter also referred to as 'common DC bus'). Taking into account the known inertia of the load coupled to the various axes, the angular velocity and the current consumption by these axes, an optimum, ideal speed curve during the run-down to come to a standstill of the textile machine is calculated for the whole system.

In order to limit transitional phenomena between the moment of the mains failure and the following of this ideal speed curve, a specific initial speed curve is first calculated for each individual axis on the basis of the values of the same parameters of each axis at the moment of the mains failure. The controller regulates the speed of each individual axis according to the initial speed curve calculated for that axis. Subsequently one controller takes over the speed control of the whole system, whereby all the axes come to a standstill with synchronous speed and fixed synchronization ratio and with an evolving speed according to the calculated speed curve, while the voltage on the common DC bus is held constantly at a constant value.

This method is typically applicable to machines of which the inertia and the load on the different axes are predictable, and the different axes can be brought to a controlled standstill via individual motor controllers.

This method has the disadvantage, however, that it is not applicable to systems such as weaving machines where such a theoretical and initial curve of the speed decrease cannot be calculated for various reasons, such as inter alia because the inertia varies as a function of the angular position of the part, because the load varies as a function of the angular position of the part as a consequence of non-linear mechanisms, because the load is not known in advance, because the loads change strongly as a function of time, such as evolving frictional losses, or because the different parts do not rotate in a speed-synchronous manner, but in a position-synchronous manner relative to one another with continuously changing ratios.

Energy recuperation by defining in advance the speed profile to be followed, and hence the speed variation, as described in WO 97/02650 also imposes dynamic limits on the components connected to a common DC supply. Since an axis with a high energy content typically allows energy recuperation, whereby this axis generally also has a higher inertia than the components connected via the intermediate circuit that have to be supplied in the event of a mains fault or mains failure, the energy change in the event of a mains fault or mains failure will be slower than for the other connected components to be supplied.

This means that the extent to which energy is recuperated is completely dependent on the mechanical properties of this axis, namely inertia and friction. The dynamic behaviour of energy recuperation by varying the speed of a primary axis is not sufficient if the other axes connected to the common DC bus react highly dynamically (positioning adjustments), in other words if the bandwidth of the positioning control loops is far higher than the bandwidth of the speed controller of the regenerating axis.

A further disadvantage with this manner of energy recuperation is that due to the continuously decreasing speed, the energy gain varies continuously with the same change in speed. At low machine speeds, this can result in unstable control of the voltage on the intermediate circuit, and this is certainly the case if the loads connected to the intermediate circuit are of the highly dynamic kind.

SUMMARY

An object of some embodiments of this invention is to provide a method and a control device having the characteristics indicated in the first paragraph of this description in which at least a number of the disadvantages indicated above do not occur, or at least occur to a lesser extent than with the state-of-the-art methods.

This object may be achieved by providing such a method and device for bringing a textile machine to a controlled standstill in which the voltage on the common DC bus is controlled by varying at least two variables in such a way that the value of this voltage follows a previously defined curve while the textile machine is being brought to a standstill.

With the term 'variable' we mean here a variable parameter that determines or influences the value of the voltage on the common DC bus. This parameter can be the voltage itself or a parameter that directly or indirectly influences the voltage.

The previously defined voltage curve can be a curve in which the value of the voltage varies, or in which the voltage takes on a constant, non-varying value. According to a preferred curve, the voltage varies stepwise. According to another preferred curve, immediately after the failure of the power supply, the voltage is brought to a constant value that is higher than the value of the voltage before the failure of the power supply.

The control device is preferably provided to be activated automatically in response to a detection of the failure of the power supply by means of a provided detection device or by detection of the fact that an instantaneous mains voltage value or an average mains voltage value (the average value over a given period of time) is lower than a given threshold value. This threshold value can be a given percentage of the nominal voltage, for example 80% or 90%.

The method and device according to some embodiments of the invention allow the textile machine to be brought to a controlled standstill by exchanging energy between the various electric motors connected to the common DC bus. The kinetic energy present in one or more axes is hereby reduced in a controlled manner while, by achieving an optimum voltage profile in the common DC bus, being able to provide a maximum amount of energy from the one or more other electric motors via that common DC bus. This is possible without the need for additional energy storage or an energy buffer. Such energy storage or energy buffer can possibly also be provided. Examples of this are hydraulic, kinetic (such as by means of a flywheel) or static energy storage (such as by means of capacitors or supercapacitors).

On a weaving loom, the component from which the energy is reduced in a controlled manner is preferably the main axis that drives the non-electrically decoupled movements. This is generally the axis to which the largest number of components is connected, so that this axis has the highest inertia and kinetic energy content. The kinetic energy is calculated using the following formula:

$$\text{Kinetic energy} = \tfrac{1}{2} \cdot J \cdot \omega^2$$

where J is the inertia of the axis and ω the angular velocity of the rotating mass.

This energy is reduced in such a way that the returning energy flow is high enough to supply the separately driven motors with the required energy. These motors can thus be enabled, for example, to bring the actuators moved by them to a sufficiently safe position and to hold them there. On servo-controlled weaving frames, for example, this is a top dead centre or bottom dead centre position so that rapier movements can no longer cause damage due to an incorrect position of the weaving frames. For rapiers this is a position outside the shed forming zone.

Not imposing a speed curve determined in advance ensures that faults in this speed curve—for example due to changes in inertia or load—do not lead to a relatively large disturbances in the voltage on the common DC bus. The control varying at least two variables ensures far smoother control behaviour. This type of control is consequently far more suitable for applications where the inertias and/or the speed ratios and/or the loads vary continuously.

With this method and device, at least one of the variables that is varied for the voltage control is preferably a motor parameter of one or more electric motors connected to the common DC bus.

One or more main axes are preferably selected that have a higher energy content during normal operation of the textile machine than the other axes of the textile machine, and at least one motor parameter of only one or more electric motors driving a main axis of the textile machine is varied.

Since the main axes (hereinafter also referred to as 'energy-dominant axes') function mainly as suppliers of energy due to their relatively high energy content, the voltage on the common DC bus can be efficiently controlled by varying at least one motor parameter of a motor driving a main axis.

In a very preferred and advantageous method, the textile machine is a machine for the manufacture of a product made from textile material, comprising one or more pattern-forming elements controllable by means of electric control means, and at least part of the control means of the pattern-forming elements is connected to the common DC bus. Preferably the control means of all pattern-forming elements of the textile machine are connected to the common DC bus. Said product is preferably a fabric or a woven or tufted carpet.

The control means of the pattern-forming elements are generally only energy consumers. These pattern-forming elements are, for example, the weaving frames of a weaving machine, the knives and the selection elements of a jacquard machine working together with a weaving machine or the pile delivery devices of a tufting machine that may or may not be equipped with a 'sliding needle bar'.

During the period the textile machine comes to a standstill, the pattern-forming elements are preferably controlled in such a way that they remain in operation forming the pattern until the textile machine has come to a complete standstill, as with a controlled switching-off of the textile machine.

The machine does not only come to a standstill in a (position-)synchronous manner, but because the pattern-forming elements continue to follow the pattern and to perform the appropriate selections during the whole period of the coming to a standstill of the textile machine, the textile machine also comes to a standstill synchronized with the pattern data and the figure forming. The textile product is manufactured with the desired pattern while the machine is coming to a standstill, preferably until the textile machine has come to a complete standstill.

This has the advantage that when the machine is started again, the operator can immediately start with the manufacture of the textile product, just as in the case with a controlled switching-off of the machine, and does not have to perform any corrective actions.

With the method and control device according to some embodiments of this invention, the voltage on the common DC bus is preferably controlled by a cascade control, also known as master-slave control. The cascade controller can be incorporated into a motor controller or can form part of a separate component.

Other multi-variable controllers can also be used, of course, but the splitting of the control loop into an outer or slower loop (or 'master') and an inner or faster loop (or 'slave') makes the control simpler.

Thanks to the cascade control, the textile machine comes to a standstill in a controlled and assured manner, even under extreme circumstances, with a control system that functions without problems even with components that have a highly dynamic and rapidly varying inertia, connected to a common DC bus. The cascade control ensures the synchronous movement (position-synchronous, angle-synchronous or speed-synchronous or any combination of these) of all the components connected to the common DC bus.

This cascade control preferably comprises:
- a relatively slow control loop in which a voltage difference is repeatedly or continuously determined, this being the difference between a measured instantaneous value of the voltage on the common DC bus and the desired voltage value at that moment, corresponding to the previously determined voltage curve, the voltage on the common DC bus is varied in such a way that the voltage difference is reduced, and the energy flow required to bring the voltage difference to zero ('the required energy flow') is determined, and
- a relatively fast control loop in which the actual value of the energy flow supplied by the axis is repeatedly or continuously calculated from the measured value of the speed of at least one axis and from one or more motor parameters of an electric motor driving the axis, and one or more motor parameters of at least one electric motor driving an axis is varied in such a way that a determined difference between the required energy flow and the calculated value of the energy flow supplied by the axis is reduced.

The actual value of the energy flow is preferably calculated for an axis with a relatively large energy content, and likewise one or more motor parameters of at least one electric motor driving an axis with a relatively large energy content is varied.

For this, the cascade control comprises a relatively fast controller within an overall (slow) controller of the voltage on the common DC bus. The control of this voltage thus becomes less sensitive to the instantaneous disturbances in one or more parameters of the one or more energy-dominant axes, for example as a result of instantaneous changes in inertia or load.

Said voltage difference determined by the slow controller is used as an input for the fast controller in order that, allowing for this voltage difference, one or more parameters are controlled in such a way that the voltage difference is minimized and the harvested energy is maximized.

The primary object of the faster internal controller is to recuperate energy. The resulting variation in speed of the axis (axes) driven by the motor, preferably energy-dominant axis (axes), is subordinate. The resulting speed profile of this axis is predominantly a consequence of the load profiles of the axes connected to the intermediate voltage circuit (common DC bus).

A motor that is controlled by the cascade controller generates energy that results in a current to the common DC bus that supplies power to the DC bus and possibly also to the logical components of the other motors. This power supply is used, for example, to bring these other motors to a standstill in a safe position in a controlled and synchronous manner and preferably also to block them in this safe position.

With the slow control loop, the voltage of the common DC bus is varied, while with the fast control loop, for example, one motor parameter of a motor driving an energy-dominant axis is varied. In this example, which is, however, in no way restrictive, two different variables or parameters are varied to achieve the desired voltage profile.

The other motors that are not connected to the common DC bus are preferably controlled on the basis of the feedback of the position control signal of the axis with which these motors are synchronized. These motors can also be controlled on the basis of the feedback of a position signal from a non-energy-dominant axis of the textile machine.

The other motors can be brought to a standstill faster relative to the at least one motor that is controlled by the cascade controller and/or according to a different motion curve than is the case during the normal operation of the textile machine. On a weaving machine these are, for example, the weaving frames that preferably come to a standstill in a dead centre position (with open shed), so avoiding the risk of collisions between yarns and rapiers.

On failure of the power supply, the holding brakes installed on the parts are preferably also engaged after a delay. The object of this is to convert as little as possible of the kinetic energy present in the machine unused into friction heat, and instead to make optimum use of this energy for the other motors connected to the common DC bus.

The cascade control preferably entails that a first value of one or more parameters that are proportional to the energy flow is calculated that is proportional to the desired energy flow, and that a second value is calculated that is proportional to the actual energy flow, and that with the relatively fast control loop, said one or more motor parameters are varied in such a way that a difference determined between the first and the second value of one or more parameters is reduced.

According to a preferred method, one or more of the following motor parameters are varied to control the voltage on the common DC bus: motor current, motor voltage, motor flux and motor torque. The voltage on the common DC bus can also be controlled by varying the motor speed and/or motor power.

The measured motor current can be used directly as a parameter, but it can also be via derivatives from this motor current (flux and torque) calculated using the motor model. The motor flux determines the torque as a function of the motor speed and the motor voltage. The control frequency can be used as a measure of the desired motor speed. The motor torque is either measured directly via a torque sensor or calculated via the motor model. A measured value (e.g. via an encoder) or a calculated value (sensorless) can be used for the motor speed. The motor power can also be measured directly or can be calculated.

Some embodiments of this invention finally also relate to a textile machine comprising at least two axes provided to be driven in synchronization by respective separately controlled electric motors connected to a common intermediate voltage circuit (common DC bus), in which at least one electric motor acting as power generator can supply electric power to at least one other electric motor via the common DC bus, and a control device according to some embodiments of this invention for bringing said axes to a controlled standstill in a condition without power supply.

In a particular embodiment, this textile machine comprises one or more main axes that have a higher energy content during normal operation of the textile machine than the other axes of the textile machine, and the control device is provided only to vary at least one motor parameter of one or more electric motors driving a main axis of the textile machine.

In a particularly advantageous embodiment it is a textile machine for the manufacture of a product made from textile material, comprising one or more pattern-forming elements controllable by means of electric control means, while at least part of said control means is connected to the common DC bus. The control means of all pattern-forming elements of the textile machine are preferably connected to the common DC bus.

The textile machine is, for example, a weaving machine or a tufting machine and the pattern-forming elements are, for example, the weaving frames of the weaving machine, the knives and the selection elements (solenoids) of a jacquard machine working together with the weaving machine or the pile delivery devices of a tufting machine that may or may not be equipped with a 'sliding needle bar'.

In a particular embodiment, this textile machine comprises a control device provided to control the pattern-forming elements in such a way during the period the textile machine comes to a standstill that the pattern-forming elements remain in operation forming the pattern until the textile machine has come to a complete standstill, as with a controlled switching-off of the textile machine.

Since the pattern-forming elements continue to follow the pattern and to perform the appropriate selections during the whole period the textile machine comes to a standstill, the machine also is fully synchronized with the pattern data and the figure forming when it comes to a standstill. The textile product, for example a woven fabric, a carpet or a knitted fabric, is produced with the desired pattern until the textile machine has come to a complete standstill. When the machine is started again, the operator can immediately start with the continued production of the textile product and does not have to perform any corrective actions.

BRIEF DESCRIPTION OF THE DRAWINGS

In order to further illustrate the characteristics of the invention, a detailed description is given below of a possible control device according to this invention. It should be clear that this is only one example of the many possible embodiments covered by the invention, and that this description can in no way be regarded as a limitation of the scope of the protection. In this detailed description, reference numbers are used to refer to the attached figures, wherein.

DETAILED DESCRIPTION OF EMBODIMENTS

Figure 1:
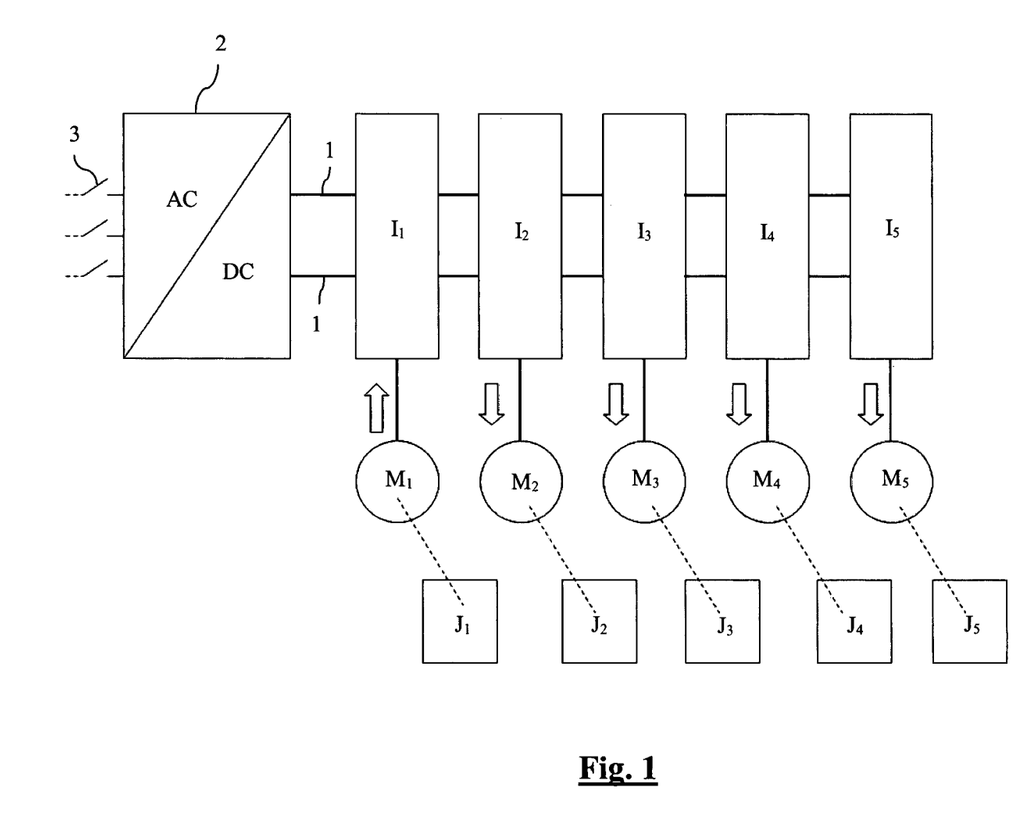
FIG. 1 is a schematic representation of the various electric motors of a textile machine according to an embodiment of this invention connected to a common DC bus.

A textile machine according to this invention in the embodiment shown schematically in FIG. 1 has five axes driven by respective electric motors ($M_1$, $M_2$, $M_3$, $M_4$, $M_5$). Each axis has its own inertia ($J_1$, $J_2$, $J_3$, $J_4$, $J_5$). The electric motors are controlled by separate motor controllers ($I_1$), ($I_2$), ($I_3$), ($I_4$), ($I_5$) and are connected to a common intermediate voltage circuit (1) or 'common DC bus'. Under normal operating conditions, they are supplied with electric power from the mains via an AC/DC converter (2) and a switching device (3).

The axis driven by the left-hand motor ($M_1$) is the axis with the highest energy content or the energy-dominant axis. On a weaving machine this is the main axis.

The word 'axis' is used to mean not only the axis itself, but also all the parts set in motion by this axis. 'Energy content' means the kinetic energy that with a rotational motion is a function of the inertia ($J_1$) and the angular velocity ($\omega$) of the axis according to the following formula:

$$\text{Kinetic energy} = \tfrac{1}{2} \cdot J_1 \cdot \omega^2$$

When a failure of the power supply or a reduction or fault in the power supply is detected by means of detection means (not shown in the figure), a control device with a cascade controller is automatically activated which ensures that the kinetic energy present in the energy-dominant axis is reduced in a controlled manner. In the process, the kinetic energy is converted by the electric motor ($M_1$) acting as a generator into electrical energy that is supplied via the common DC bus (1) to the other electric motors ($M_2$, $M_3$, $M_4$, $M_5$) connected to the common DC bus (1). The supply of energy by the electric motor ($M_1$) is indicated symbolically in FIG. 1 by means of an arrow pointing upwards. The consumption of energy by the other electric motors ($M_2$, $M_3$, $M_4$, $M_5$) is indicated symbolically by means of arrows pointing downwards. The cascade controller (20),(21) is described in further detail by reference to FIGS. 2 and 3.

Via the cascade controller (20), (21), the available energy is reduced in such a way that the returning energy flow is high enough to supply the separately driven motors with energy and to enable these to bring the associated actuators to a sufficiently safe position and to block them there. On servo-controlled weaving frames, for example, this is a top dead centre or bottom dead centre position so that rapier movements can no longer cause damage due to an incorrect position of the weaving frames. For rapiers this is a position outside the shed forming zone.

Figure 2:
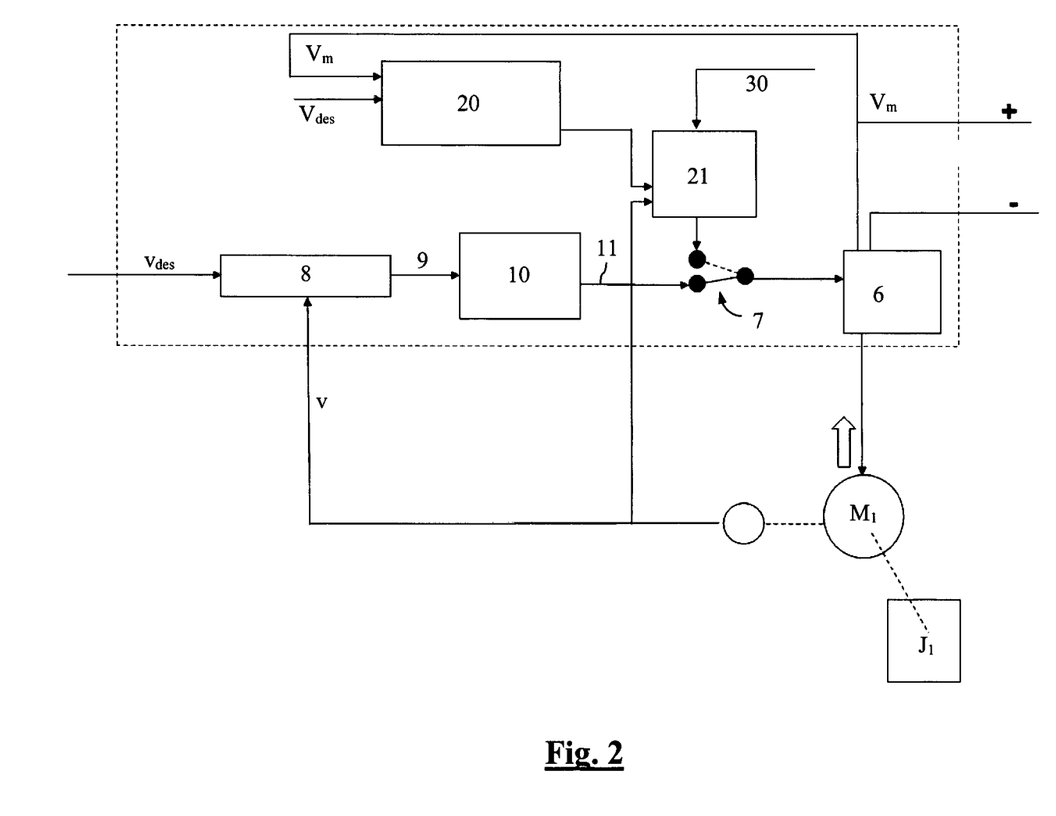
FIG. 2 is a schematic representation of a control device for bringing a textile machine to a controlled standstill according to an embodiment of this invention.

FIG. 2 shows a schematic representation of a possible embodiment of the control system for the energy-dominant axis with inertia ($J_1$) that is driven by motor ($M_1$). In variant embodiments, the location and the arrangement of the controllers differ.

The motor controller (6) ensures the pure hardware transformation of the desired motor behaviour by controlling the motor currents. This motor controller (6) is provided at the input with a switch (7) that can be either mechanical or electronic or purely in the form of software.

The device also comprises a speed controller (8) that bases its control on the measured value (v) of the instantaneous speed and a certain target value or a desired speed ($v_{des}$). In a normal operating situation, the output signal (9) from this speed controller current (8) is transmitted to a torque or frequency controller (10) to determine the optimum motor current.

The output (11) from the torque or frequency controller (10) is connected via the switch (7) to the motor controller (6) which controls the motor ($M_1$) directly on the basis of the specific desired motor current.

The device also comprises detection means for detecting the failure of the power supply. These detection means (not shown in the figure) are provided to transmit a detection signal to the switch so that this switch (7) can be switched from the position indicated by the solid line in which the motor controller (6) is connected to the output of the combination of speed controller (8) and torque or frequency controller (10) to the position indicated by the dotted line in which the motor controller (6) is connected to the output of the cascade controller (20), (21).

After detection of the failure of the power supply (mains failure or mains drop) or after detection of a reduced or disturbed power supply, the normal speed control (8), (10) with this/these motor controller(s) is thus replaced by a special cascade controller (20), (21) with a slow and a fast control loop with the goal of making efficient use of the kinetic energy present in the global system as much as possible (energy harvesting) so that both the main system with the energy-dominant axis driven by the electric motor ($M_1$) and all the sub-systems with the respective axes driven by the other electric motors ($M_2$-$M_5$) connected to the intermediate voltage circuit (common DC bus) can be brought to a standstill in a safe manner.

According to some embodiments of the invention, the voltage (V) on the common DC bus (1) is allowed to follow the most favourable possible curve instead of allowing the speed of the energy-dominant axis to follow an imposed deceleration profile.

Depending on the known characteristics, the conditions, the desired result, etc., the values for a number of parameters of the dominant axis can be used in the faster cascade control loop (21) to compensate the fault in the voltage (V) of the common DC bus (1) as well as possible.

In addition to the measured value (v) for the speed, this cascade controller (20),(21) also uses a number of other measured parameters (30), including the motor current, motor voltage, etc., and parameters (30') calculated on the basis of a motor model from the measured parameters (30), such as the motor flux.

Figure 3:
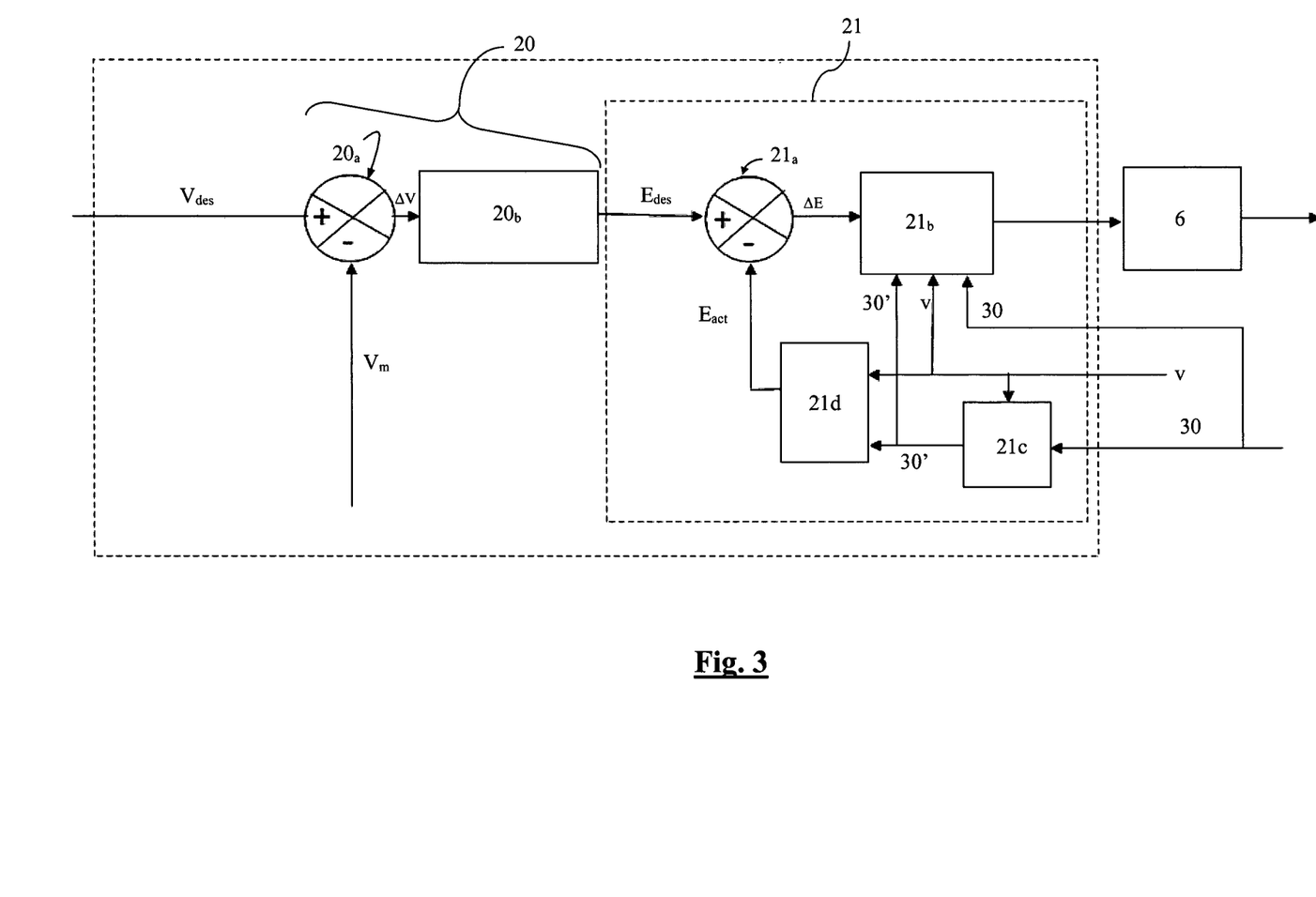
FIG. 3 is a schematic representation of the cascade controller of the control device according to FIG. 2.

FIG. 3 is an illustration of a possible implementation of the cascade controller (20), (21) in which the motor controller (6) is connected to the output of the cascade controller (20), (21); this represents the situation after detection of a failure of the power supply (mains failure or mains drop) or after detection of a reduced or disturbed power supply. This cascade controller consists of a slower common DC bus controller (20) and a faster internal controller (21).

Figure 4:
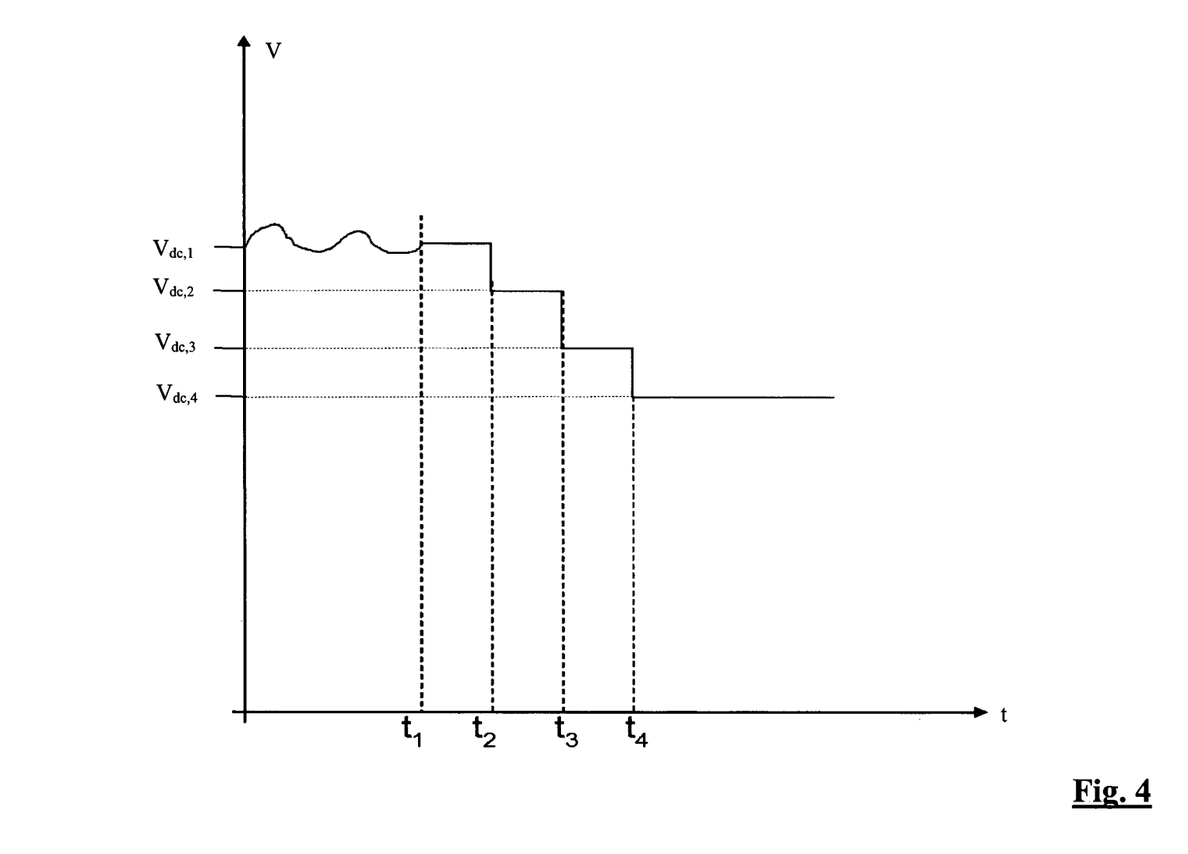
FIG. 4 shows a stepwise declining curve of the voltage on the common DC bus.
Figure 5:
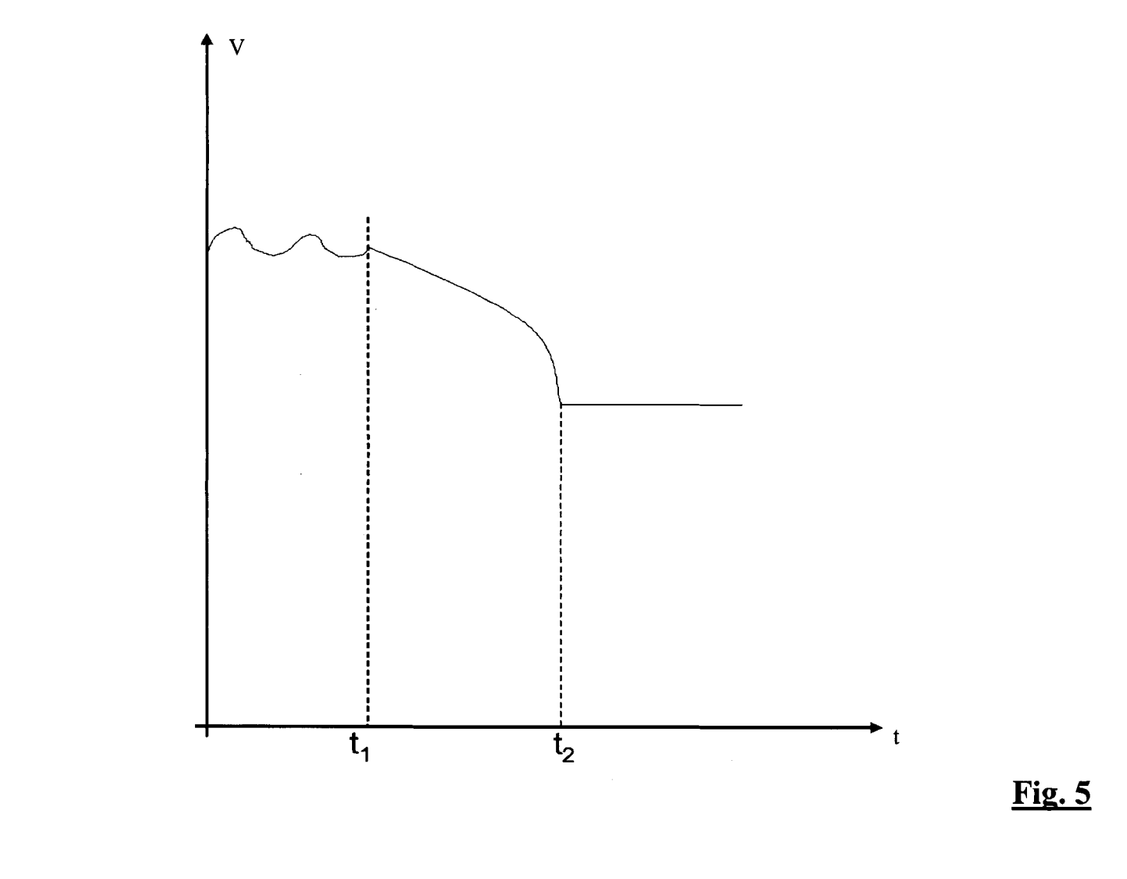
FIG. 5 shows a continuously declining curve of the voltage on the common DC bus.

The slower common DC bus controller (20) comprises a comparator (20a) and a control section (20b). In the first instance, the slower common DC bus controller (20) controls the voltage (V) to the desired voltage level. For this, the voltage difference ($\Delta V$) is continuously determined in the comparator (20a) between the measured actual value ($V_m$) of the voltage (V) on the common DC bus (1) and the desired value ($V_{des}$) at that moment of the voltage (V) corresponding to the previously determined curve of the voltage (V). Examples of this imposed voltage curve are shown in FIGS. 4 and 5.

The control section (20b) of the slower common DC bus controller (20) continuously varies the voltage (V) of the common DC bus with the goal of reducing the determined voltage difference ($\Delta V$).

The output signal from the control section (20b) is a parameter (it can also be several parameters) that is proportional to the difference between the desired DC bus voltage ($V_{des}$) and the actual measured DC bus voltage ($V_m$), such as this voltage difference itself or other values calculated from this. This voltage difference or this calculated value is in any case representative of the energy flow ($E_{des}$) required (hereinafter referred to as 'the required energy flow') to reduce the determined voltage difference ($\Delta V$)—i.e. the measuring error of the slow controller (20)—to zero, and this is used as input signal for the faster controller (21).

The faster controller (21) comprises a comparator (21a), a control section (21b), a first computation module (21c) provided to calculate certain other parameters from measured parameters on the basis of a motor model, and a second computation module (21d).

In the first computation module (21c), a number of other parameters (30') are calculated from the measured values (v) of the instantaneous speed and from other measured parameters (30) on the basis of the motor model, and from these measured (v) and calculated parameters (30') the value of a parameter representative of the actual value ($E_{act}$) of the energy flow supplied by the dominant axis is calculated in the second computation module (21d).

If a difference ($\Delta E$) is determined between the required energy flow ($E_{des}$) and the calculated value of the energy flow ($E_{act}$) supplied by the energy-dominant axis, the faster controller (21) will vary one or more motor parameters ($I_{mot}$, $V_{mot}$, $\phi_{mot}$, $T_{mot}$) of the electric motor ($M_1$) driving the energy-dominant axis with the goal of reducing this determined difference ($\Delta E$) to zero.

The control error ($\Delta V$) of the slow controller (20) is therefore used as an input in order to control one or more parameters of the electric motor ($M_1$) driving the energy-dominant axis taking this control error into account in such a way that this error is minimized and the harvested energy is maximized.

Internally in the cascade controller (20), (21), the slow controller (20) continuously adapts the target value of the selected control parameter $E_{des}$ so that the voltage (V) on the common DC bus follows the previously determined curve.

If the instantaneous voltage ($V_m$) on the common DC bus is lower than the desired value ($V_{des}$) for that voltage, energy has to be harvested. The electric motor ($M_1$) of the energy-dominant axis then has to act as a generator (operate in 'generator mode'), whereby kinetic energy is being converted into electrical energy that is supplied via the common DC bus to the connected electric motors of the whole system. As a result, the instantaneous voltage ($V_m$) increases.

If the instantaneous voltage ($V_m$) is higher than the desired value ($V_{des}$) of that voltage, the energy-dominant axis can run in production mode. In production mode, the electric motor has a predominantly motoring or driving behaviour. In order to not have to provide undesirable and otherwise useless energy-dissipating components (in the form of brakes, resistance elements, etc.), the energy-dominant axis can at that moment increase its speed so that the excess kinetic energy is not lost and the whole system has sufficient energy available over a prolonged period.

For this control device, the cascade control is of particular importance, particularly the interaction between on the one hand the internal faster controller (21) that both compensates instantaneous variations in speed and friction of the energy-dominant axis and at the same time cushions the drop in energy as a result of the decreasing machine speed, and on the other hand the slower common DC bus controller (20) that compensates the instantaneous voltage variations as a result of the drives connected to the common DC bus (1).

As a result of this cascade control with a high closed-loop bandwidth thanks to the internal faster controller (21), the mechanical properties of the energy-dominant axis (its inertia and friction) have practically no influence on the effectiveness of the voltage control.

In order to make the maximum energy content of the main axis available to all the motors, the final voltage of the common DC bus must be reduced as far as possible. In other words, the energy content present in the textile machine must be used up as much as possible.

Initially the target value of the voltage on the common DC bus at the moment of failure of the power supply is equal to the maximum permissible value. Alternatively, the value of the voltage on the common DC bus at the moment of failure of the power supply can also be taken as the target value.

The imposed voltage on the common DC bus can be constant, for example the maximum permitted voltage on the common DC bus or the voltage on the common DC bus at the moment of failure of the power supply. The imposed voltage can also be variable.

Examples of the curve of the voltage on the common DC bus imposed by the control device according to some embodiments of this invention are:
- a constant higher value (voltage boost) relative to the initial value immediately after the failure of the power supply; and
- a constant lower value relative to the initial value immediately after the failure of the power supply; and
- a varying value, decreasing as a function of the decreasing speed of the movements in order to be able to use the regenerated energy for as long as possible.

The controller can be coupled to one single motor controller, preferably the motor controller of the motor with the highest kinetic energy, or to several motor controllers if there are several energy-dominant axes.

FIG. 4 illustrates a possible imposed curve of the voltage (V) on the common DC bus as a function of time (t), where the target value of the voltage decreases stepwise and successively takes on the following constant values:
- $V_{dc,1}$: the target value with power failure at time $t_1$
- $V_{dc,2}$: the reduced target value from time $t_2$
- $V_{dc,3}$: the further reduced target value from time $t_3$, and
- $V_{dc,4}$: the lowest target value from time $t_4$.

These values for the voltage on the common DC bus ensure a sufficiently high speed of the connected axes and also guarantee the minimum required operating voltage for the servo-controlled axes (e.g. 250 to 300 volt DC).

From time $t_4$, the desired common DC bus voltage must remain constant in order to maintain a good function of the system.

Instead of a stepwise reduction in the target value of the common DC bus controller, a voltage curve following a continuously varying function can be imposed. This type of curve is shown in FIG. 5. This function is determined, taking into consideration the dynamic behaviour of the connected primary and secondary axes.

In one variant of this, this function can also be determined by the moment of the failure of the power supply, taking into consideration the position and corresponding energy behaviour of the connected axes at that moment in time.

The invention claimed is:

1. A method for bringing a textile machine to a controlled standstill in a condition without power supply or with reduced or disturbed power supply, the textile machine having at least two axes provided to be driven in synchronization by respective separately controlled electric motors connected to a common intermediate voltage circuit (common DC bus), and in which at least one electric motor acting as power generator can supply electric power to at least one other electric motor via the common DC bus, comprising controlling the voltage on the common DC bus by varying at least two variables in such a way that the value of the voltage follows a previously defined curve while the textile machine is being brought to a standstill, wherein the voltage on the common DC bus is controlled by a cascade control, and
wherein the cascade control comprises:
a relatively slow control loop repeatedly or continuously determining a voltage difference, being the difference between a measured instantaneous value of the voltage on the common DC bus and the desired value at that moment of the voltage corresponding to the previously determined curve of the voltage,
varying the voltage on the common DC bus in such a way that the voltage difference is reduced, and
determining the energy flow required to bring the voltage difference to zero.

2. The method according to claim 1, characterized in that at least one of said variables is a motor parameter of one or more electric motors.

3. The method according to claim 1, characterized in that one or more main axes are selected that have a higher energy content during normal operation of the textile machine than the other axes of the textile machine, and that at least one motor parameter of only one or more electric motors driving a main axis of the textile machine is varied.

4. The method according to claim 1, characterized in that the textile machine is a machine for the manufacture of a product made from textile material, comprising one or more pattern-forming elements controllable by means of electric controllers, and that at least part of said controllers of the pattern-forming elements is connected to the common DC bus.

5. The method according to claim 4, characterized in that the pattern-forming elements are controlled in such a way during the period the textile machine comes to a standstill that they remain in operation forming the pattern until the textile machine has come to a complete standstill, as with a controlled switching-off of the textile machine.

6. The method according to claim 1, characterized in that the cascade control further comprises:
a relatively fast control loop repeatedly or continuously calculating the actual value of the energy flow supplied by the axis from the measured value of the speed of at least one axis and from one or more motor parameters of an electric motor driving the axis, and
varying one or more motor parameters of at least one electric motor driving an axis in such a way that a determined difference between the required energy flow and the calculated value of the energy flow supplied by the axis is reduced.

7. The method according to claim 6, characterized in that the cascade control entails calculating a first value of one or more parameters that are proportional to the energy flow that is proportional to the desired energy flow, and calculating a second value that is proportional to the actual energy flow, and with the relatively fast control loop, varying said one or more motor parameters in such a way that a difference determined between the first and the second value of one or more parameters is reduced.

8. The method according to claim 1, characterized in that one or more of the following motor parameters are varied to control the voltage on the common DC bus: motor current, motor voltage, motor flux and motor torque.

9. A control device for bringing a textile machine to a controlled standstill in a condition without power supply or with reduced or disturbed power supply, the textile machine having at least two axes provided to be driven in synchronization by respective separately controlled electric motors connected to a common intermediate voltage circuit (common DC bus), and in which at least one electric motor acting as power generator can supply electric power to at least one other electric motor via the common DC bus, wherein the control device is provided to control the voltage on the common DC bus by varying at least two variables in such a way that the value of this voltage follows a previously defined curve while the textile machine is being brought to a standstill,     wherein the control device comprises a cascade control for controlling the voltage on the common DC bus, and     wherein the cascade control comprises:

a relatively slow control loop repeatedly or continuously             determining a voltage difference, being the difference between a measured instantaneous value of the voltage on the common DC bus and the desired value at that moment of the voltage corresponding to the previously determined curve of the voltage,             varying the voltage on the common DC bus in such a way that the voltage difference is reduced, and             determining the energy flow required to bring the voltage difference to zero.

10. The control device according to claim 9, characterized in that at least one of said variables is a motor parameter of one or more electric motors.

11. The control device according to claim 9, characterized in that the cascade control comprises:

a relatively fast control loop provided to repeatedly or continuously         calculate the actual value of the energy flow supplied by the axis from the measured value of the speed of at least one axis with a relatively large energy content, and from one or more motor parameters of an electric motor driving the axis, and         vary one or more motor parameters of at least one electric motor driving an axis in such a way that a determined difference between the required energy flow and the calculated value of the energy flow is reduced.

12. The control device according to claim 11, characterized in that the cascade control is provided to calculate a first value that is proportional to the desired energy flow from one or more parameters that are proportional to the energy flow, and to calculate a second value that is proportional to the actual energy flow, and, with the relatively fast control loop, to vary said one or more motor parameters in such a way that a difference determined between the first and the second value of one or more parameters is reduced.

13. The control device according to claim 9, characterized in that it is provided for bringing a textile machine to a controlled standstill in a condition without power supply or with reduced or disturbed power supply by controlling the voltage on the common DC bus by varying at least two variables in such a way that the value of the voltage follows a previously defined curve while the textile machine is being brought to a standstill.

14. A textile machine comprising at least two axes provided to be driven in synchronization by respective separately controlled electric motors connected to a common intermediate voltage circuit (common DC bus), in which at least one electric motor acting as power generator can supply electric power to at least one other electric motor via the common DC bus, and a control device for bringing said axes to a controlled standstill in a condition without power supply or with reduced or disturbed power supply, wherein the textile machine comprises a control device according to claim 9.

15. The textile machine according to claim 14, characterized in that it comprises one or more main axes that have a higher energy content during normal operation of the textile machine than the other axes of the textile machine, and that the control device is provided only to vary at least one motor parameter of one or more electric motors driving a main axis of the textile machine.

16. The textile machine according to claim 14, characterized in that it is a machine for the manufacture of a product made from textile material, comprising one or more pattern-forming elements controllable by means of electric controllers, and that at least part of said controllers of the pattern-forming elements is connected to the common DC bus.

17. The textile machine according to claim 16, characterized in that it comprises a control device provided to control the pattern-forming elements in such a way during the period the textile machine comes to a standstill that the pattern-forming elements remain in operation forming the pattern until the textile machine has come to a complete standstill, as with a controlled switching-off of the textile machine.

\* \* \* \* \*